United States Patent
Janson et al.

(10) Patent No.: US 7,455,135 B2
(45) Date of Patent: Nov. 25, 2008

(54) TORQUE TRANSFER CASE FOR A HYBRID ELECTRIC VEHICLE

(75) Inventors: David Janson, Plymouth, MI (US); Reid Baldwin, Howel, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 11/161,734

(22) Filed: Aug. 15, 2005

(65) Prior Publication Data

US 2007/0034427 A1 Feb. 15, 2007

(51) Int. Cl.
*B60K 1/00* (2006.01)

(52) U.S. Cl. .................. 180/65.3; 180/65.6; 180/65.8

(58) Field of Classification Search ............. 180/65.1, 180/65.2, 65.4, 65.8, 247, 248, 249, 197, 180/65.3, 65.6; 903/903, 916, 917, 921, 903/940; 290/40 C; 701/22, 88
See application file for complete search history.

(56) References Cited

U.S. PATENT DOCUMENTS

| 4,405,029 A | 9/1983 | Hunt |
| 4,470,476 A | 9/1984 | Hunt |
| 4,723,624 A * | 2/1988 | Kawasaki et al. ........... 180/233 |
| 5,461,568 A * | 10/1995 | Morita ......................... 701/88 |
| 6,146,302 A | 11/2000 | Kashiwase |
| 6,176,808 B1 | 1/2001 | Brown et al. |
| 6,184,603 B1 | 2/2001 | Hamai et al. |
| 6,449,552 B2 | 9/2002 | Ohba et al. |
| 6,464,608 B2 | 10/2002 | Bowen et al. |
| 6,524,217 B1 | 2/2003 | Murakami et al. |
| 6,533,692 B1 | 3/2003 | Bowen |
| 6,533,693 B2 | 3/2003 | Bowen et al. |
| 6,589,128 B2 | 7/2003 | Bowen |
| 6,617,704 B2 * | 9/2003 | Tomikawa .................. 903/903 |
| 6,648,785 B2 | 11/2003 | Porter |
| 6,679,799 B2 | 1/2004 | Bowen |
| 6,719,656 B2 | 4/2004 | Bowen |
| 6,881,168 B2 | 4/2005 | Bowen |
| 6,896,635 B2 | 5/2005 | Tumback |
| 6,930,405 B2 * | 8/2005 | Gunji ........................ 180/65.1 |
| 2005/0109550 A1 * | 5/2005 | Buglione et al. ........... 180/65.2 |

* cited by examiner

*Primary Examiner*—Hau V Phan
(74) *Attorney, Agent, or Firm*—David B. Kelley; Brooks Kushman P.C.

(57) ABSTRACT

A torque transfer case for a hybrid electric vehicle powertrain is disclosed. The transfer case receives torque from a power transmission mechanism and distributes driving torque to a primary traction wheel and axle assembly and to a secondary traction wheel and axle assembly wherein an electric motor power boost for each traction wheel and axle assembly is available as well as a regenerative braking power recover from either or both.

17 Claims, 5 Drawing Sheets

| MODE | CLUTCH A | CLUTCH B | CLUTCH C | POWER BOOST | BRAKE REGENERATION |
|---|---|---|---|---|---|
| 2 HIGH | X | | | TO FRONT WHEELS | FROM FRONT WHEELS |
| 4 HIGH | X | | X | TO ALL WHEELS | FROM ALL WHEELS |
| 4 LOW | | X | X | TO ALL WHEELS | FROM ALL WHEELS |

Fig. 5

| MODE | CLUTCH A | CLUTCH B | CLUTCH C | POWER BOOST | BRAKE REGENERATION |
|---|---|---|---|---|---|
| HIGH AWD | X | | | TO FRONT WHEELS | FROM FRONT WHEELS |
| HIGH LOCKED 4WD | X | | X | TO ALL WHEELS | FROM ALL WHEELS |
| LOW LOCKED 4WD | | X | X | TO ALL WHEELS | FROM ALL WHEELS |

Fig. 6

TORQUE TRANSFER CASE FOR A HYBRID ELECTRIC VEHICLE

BACKGROUND OF THE INVENTION

1. Field of the Invention

The invention relates to hybrid electric vehicle powertrains having all-wheel drive and four-wheel drive capabilities.

2. Background Art

Known transmission designs for hybrid electric vehicles typically include torque transmitting gearing to establish torque delivery from dual power sources (i.e., an engine and an electric motor) to vehicle traction wheels. The torque transmitting gearing may have a fixed ratio or more than one ratio depending upon its configuration. The motor, which is electrically coupled to a generator, can be connected to the traction wheels through a torque flow path in parallel disposition with respect to a torque flow path from the engine. A planetary gear unit may be used to establish the torque flow paths for the engine and the motor. A battery sub-system acts as an energy storage system for the generator and the motor. A hybrid electric vehicle powertrain of this type is disclosed in co-pending patent application Ser. No. 10/605,313, filed Sep. 22, 2003, now U.S. Pat. No. 6,994,360, which is assigned to the assignee of the present invention. Reference may be made to that co-pending application to supplement the present disclosure. That co-pending application is assigned to the assignee of the present invention.

Because of the speed ratio of the gearing in a powertrain of the type disclosed in the co-pending application, the generator speed can be varied to achieve control of the engine speed so that the engine may operate at its most efficient brake specific fuel consumption point. The gearing divides engine power output into a mechanical power flow path and an electrical power flow path to a power output drive shaft for an axle assembly for a pair of traction wheels. The operating characteristic of the powertrain of the co-pending patent application has a functional similarity to the characteristic of a conventional continuously variable transmission in an automotive vehicle powertrain that does not rely upon battery power.

It is possible for a powertrain of the type shown in the co-pending application to use motor and battery power independently of the engine to power the vehicle.

Unlike the powertrain disclosed in the co-pending application, which is characterized as a two-wheel drive powertrain, an all-wheel drive hybrid electric vehicle powertrain is disclosed in co-pending patent application Ser. No. 10/747,429, filed Dec. 29, 2003, now U.S. Pat. No. 7,163,480, which also is owned by the assignee of the present invention. The invention disclosed in that co-pending patent application includes a traction motor disposed on a front wheel axis of the vehicle, thereby providing driving torque to the vehicle front wheels as engine power and generator power are distributed through divided power flow paths to the rear traction wheels.

U.S. Pat. No. 6,648,785 shows a hybrid electric vehicle powertrain configuration with four-wheel drive capability in which a torque transfer case distributes power from a multiple ratio power transmission to both the front and rear axles for the vehicle traction wheels. It includes an electric motor/generator as well as an internal combustion engine. Unlike the powertrains discussed in the preceding paragraphs, wherein an electric motor/generator and the engine can be used either separately as a power source or in combination for delivering power through parallel power flow paths to the traction wheels, the invention of the '785 patent includes a transfer case with two power output elements that are connected separately to a secondary driveshaft for the front traction wheels and the primary driveshaft for the rear traction wheels. Planetary gearing is used to augment the torque distributed to the secondary driveshaft from the electric motor. Engine power can be distributed to either or both of the driveshafts from the engine.

SUMMARY OF THE INVENTION

The present invention comprises a hybrid electric vehicle powertrain having either all-wheel drive characteristics or four-wheel drive characteristics. For purposes of this disclosure, an "all-wheel drive powertrain" can be defined as a powertrain capable of delivering power from either a single power source or a dual power source with torque being distributed simultaneously to each of the four traction wheels through selectively controllable clutches. Typically a so-called center differential would be used to divide driving torque between forward and rearward traction wheels. The all-wheel drive characteristics of a hybrid electric vehicle powertrain include a capability for recovering regenerative braking energy from each of the forward and rearward traction wheels for storage in a battery that forms a part of the electric drive portion of the powertrain.

The term "four-wheel drive powertrain" for purposes of this disclosure, can be defined as a powertrain in which driving torque, in the case of a hybrid electric vehicle powertrain, is distributed selectively from an electric power source and an engine, together or independently, to the front and rear traction wheels. A selectively engageable clutch system is used to establish either a two-wheel drive capability or a four-wheel drive capability depending upon an engagement and release pattern for the clutches.

In one embodiment of the present invention, the powertrain has a part-time four-wheel drive capability. Engine power can be delivered through a multiple ratio transmission to a range coupler having two selectively engageable clutches, one of which connects the transmission output shaft to a planetary torque multiplication unit, which in turn delivers driving torque from the transmission output shaft, located on a first axis, to a driveshaft for the front traction wheel and axle assembly located separately on a second axis in spaced parallel disposition with respect to the first axis. This driving torque delivery is through a torque transfer cross-drive. The gearing is capable of a high range operating mode or a low range operating mode, depending upon a range coupler clutch selection. The range coupler can connect the transmission output shaft to the driveshaft for the rear traction wheel and axle assembly to effect a mechanical torque flow path.

In a second embodiment of the present invention, driving power is distributed from a transmission output shaft on a first axis through a range coupler with selectively engageable clutches and through a torque-splitter differential gear unit to a rear traction wheel and axle assembly. The portion of the driving power that is not distributed to the rear traction wheel and axle assembly is distributed to a front traction wheel and axle assembly. The range coupler distributes torque from the transmission output shaft to the torque input element of a torque multiplying gearset, which in turn delivers power to the front traction wheel and axle assembly through a torque transfer cross-drive with a torque output member on a second axis. The range coupler clutches establish each of two speed ratios, a high ratio and a low ratio. Regenerative braking energy is recovered from the front traction wheels.

In the second embodiment, power is distributed, during operation in a first mode, to each of the traction wheels, and regenerative braking energy can be recovered from the front traction wheels for storage in the hybrid electric vehicle powertrain battery. In second and third operating modes, respectively characterized by a high ratio and a low ratio, regenerative braking energy can be recovered from both the front and rear traction wheels. The power delivered by the engine can be boosted using electric motor power, which is distributed to both the front traction wheels and the rear traction wheels or to the front traction wheels only depending upon the range coupler clutch selection.

The torque-splitter differential gear unit of the second embodiment may be a compound planetary gear unit with a 4×4 coupler clutch for selectively connecting the planetary sun gear to a compound planetary gear carrier to lock-up the gear unit. It is characterized by a torque split between the rear and front traction wheel and axle assemblies with a ratio that may be about 50:50.

In a third embodiment, the torque-splitter differential gear unit may be a simple planetary gear unit with a 4×4 coupler clutch for connecting the planetary sun gear to the planetary ring gear to lock-up the gear unit. It is characterized by a torque split between the rear and front traction wheel and axle assemblies with a ratio that may be about 60:40.

BRIEF DESCRIPTION OF THE DRAWINGS

FIG. 5 is a chart showing the operating modes for a part-time, four-wheel drive powertrain embodying the invention; and FIG. 6 is a chart showing the operating modes for both the powertrain configuration of FIG. 3 and the powertrain configuration of FIG. 4.

PARTICULAR DESCRIPTION OF AN EMBODIMENT OF THE INVENTION

Figure 1:
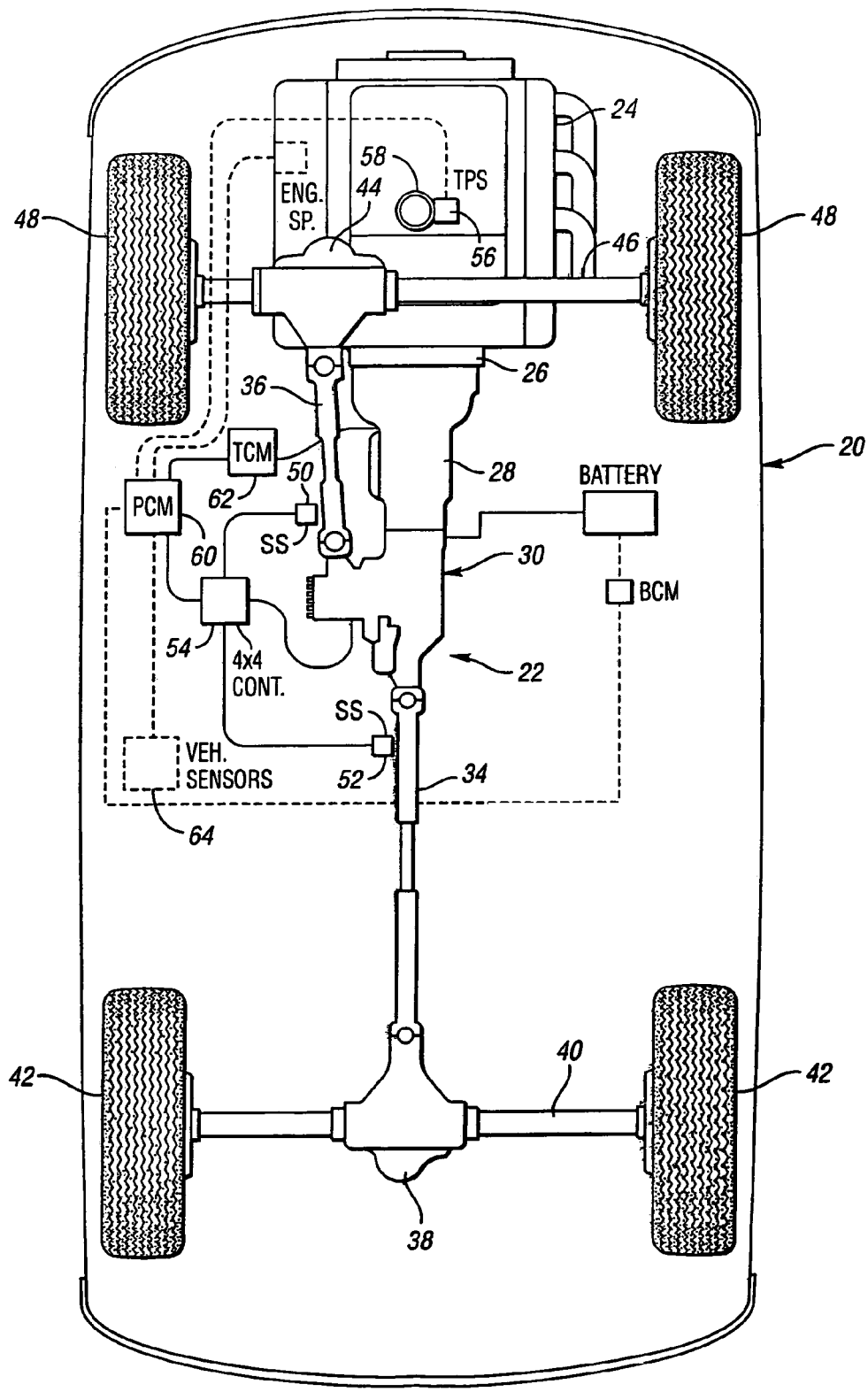
FIG. 1 is a schematic representation of a hybrid electric vehicle powertrain with an engine, a multiple-ratio transmission, a front traction wheel axle assembly, a rear traction wheel axle assembly and a transfer case, including an electric motor, for transferring torque to a front traction wheel and axle assembly.

A hybrid electric vehicle is shown at 20 in FIG. 1. It has a vehicle driveline 22, including an engine 24 engaged with a torque converter 26, which in turn is engaged with a power input element of an automatic transmission 28. As an alternative, the torque converter and the automatic transmission can be replaced with a friction clutch and a manual transmission, but this configuration will not be described here because these components are conventional and well known in the art.

The automatic transmission 28 is engaged with the torque input of a torque transfer case 30. It is connected to a rear axle (primary) driveshaft 34 and a front axle (secondary) driveshaft 36. The rear axle driveshaft 34 is coupled to a rear differential 38, which is connected to a rear (primary) axle 40. Axle 40, in turn, is connected to a pair of rear traction wheels and tires 42. The front driveshaft 36 is coupled to a front differential 44, which is connected to a front (secondary) axle 46. Axle 46, in turn, is connected to a pair of front traction wheels and tires 48.

A front driveshaft speed sensor 50 is located to sense the rotational speed of the front driveshaft 36. A rear driveshaft speed sensor 52 is located to sense the rotational speed of the rear driveshaft 34. The outputs of the front speed sensor 50 and the rear speed sensor 52 are input to a 4×4 powertrain control module 54. Alternatively, a pair of front speed sensors (not shown), each one being associated with a different one of the front wheels 48, can measure the speed of each of the front wheels 48. In that case, an average of the two wheel speeds is used instead of the speed of the secondary driveshaft 36. Also, alternatively, a pair of rear speed sensors (not shown), each one being associated with a different one of the rear wheels 42, can measure the speed of each of the rear wheels 42. In that case, an average of the two wheel speeds is used instead of the speed of the primary driveshaft 34. In any event, the speed of the front driveshaft 36 and the rear driveshaft 34 can be determined.

The 4×4 control module 54 controls clutches within transfer case 30. The clutches will be described subsequently. The transfer case distributes variable percentages of torque to the front driveshaft 36 and the rear (primary) driveshaft.

A throttle position sensor 56, which is mounted on a throttle body 58 on the engine 24, measures the throttle angle (throttle opening) and sends a throttle position output (TPS) signal to a powertrain control module (PCM) 60. The PCM 60 may apply error corrections to the TPS signal before sending the TPS signal to the 4×4 control module 54. The TPS is measured from zero percent, which is the throttle closed position, to one hundred percent, which is full open throttle position. The PCM 60 is also in communication with a transmission control module (TCM) 62, which controls the operation of the automatic transmission 28.

FIG. 1 shows schematically at 64 vehicle sensors, in addition to an engine speed sensor and those specifically illustrated in FIG. 1 at 50, 52 and 56, that would be used in FIG. 1 shows a battery for powering the electric motor of the transfer case. A battery control module BCM, which is electrically coupled to powertrain control module 60 and the battery, controls battery performance.

Figure 1A:
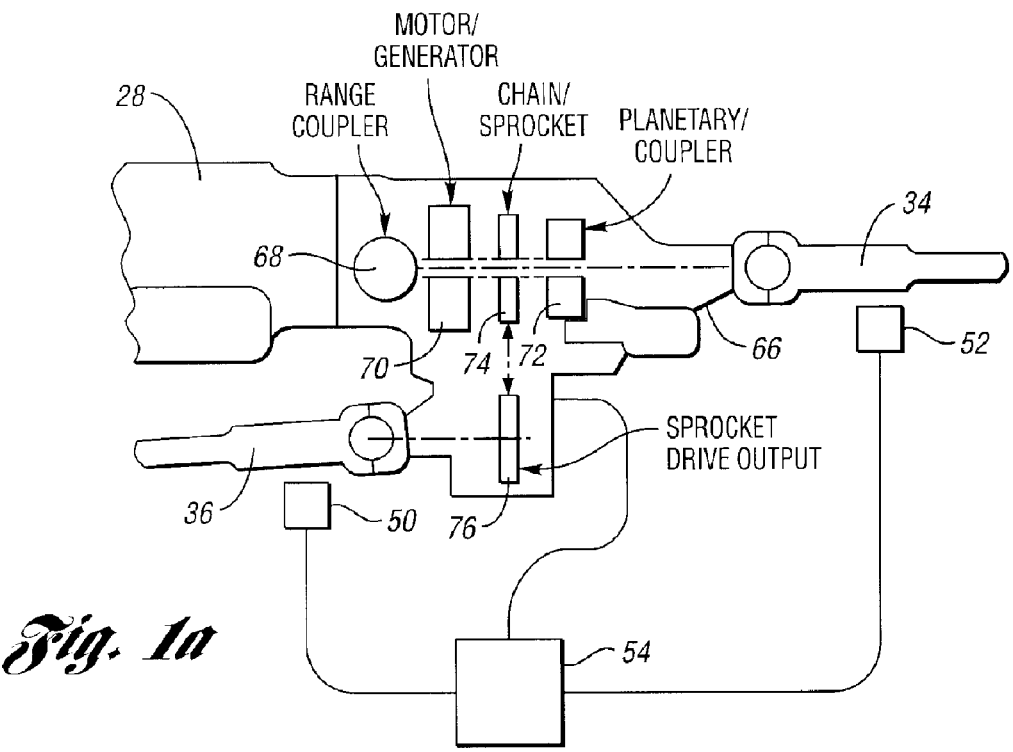
FIG. 1a is an enlarged schematic view of the transfer case illustrated in FIG. 1.

FIG. 1a shows in general schematic form the principal components of the transfer case that will be described more particularly with reference to FIGS. 2, 3 and 4. The transfer case includes a housing 66, which is bolted or otherwise secured to the rearward end of transmission 28. The output shaft of transmission 28 distributes power to a range coupler 68, which distributes torque to the rotor of a motor/generator 70 and to planetary gearing for a torque divider or differential and to torque multiplying gearing generally located at 72.

A chain and sprocket assembly 74 is disposed between the planetary gearing 72 and the motor/generator 70. The chain and sprocket assembly includes a chain transfer drive or cross-drive to a power output drive sprocket 76, which is mechanically coupled to the secondary driveshaft 36 through a universal joint. As schematically shown, the gearing 72 is connected also to a torque output shaft that in turn is connected through the universal joint to primary axle driveshaft 34.

Figure 2:
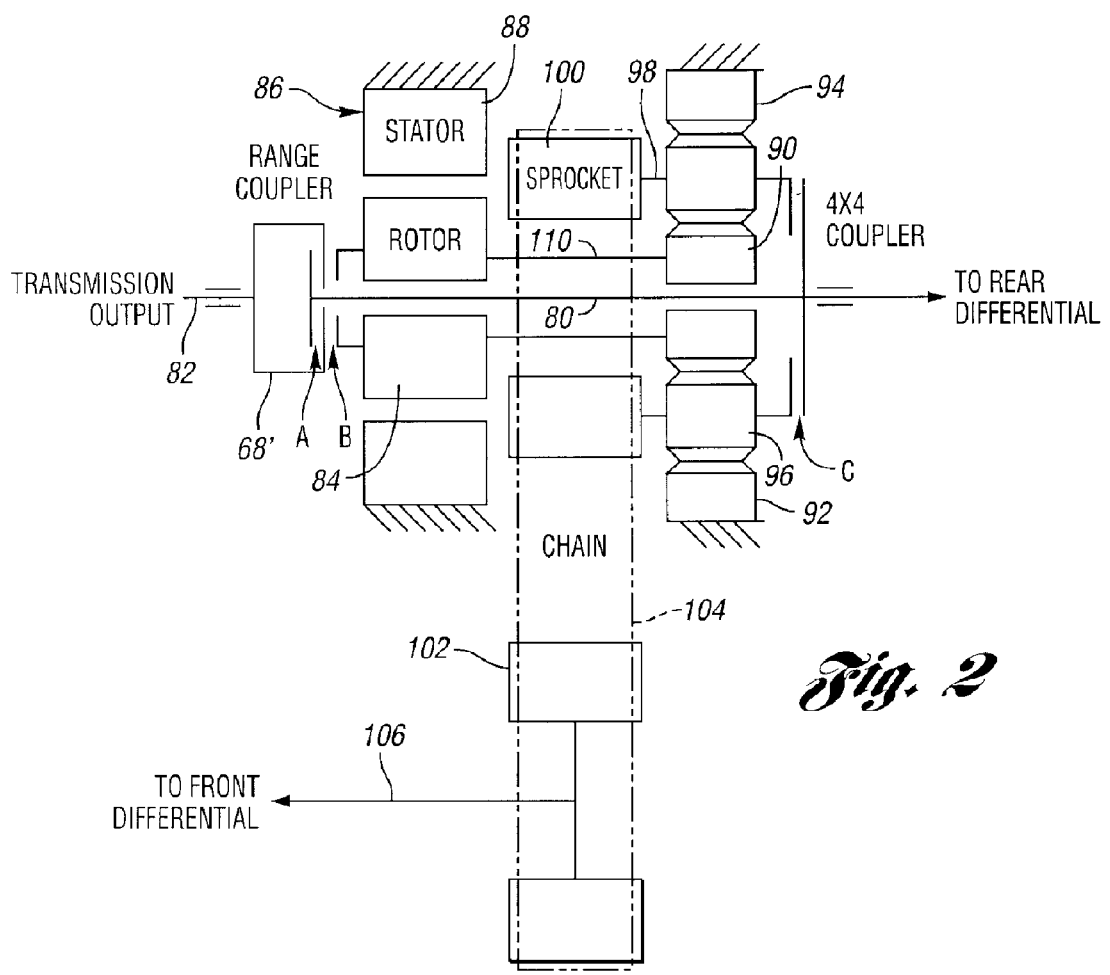
FIG. 2 is a schematic diagram of the elements of a first embodiment of the invention, which is characterized by a part-time, four-wheel drive capability.

As seen in FIG. 2, the transfer case includes range coupler 68', which comprises a first clutch A and a second clutch B. Clutch A functions to connect torque output shaft 80 to a transmission torque output shaft 82. Clutch B, when it is activated, connects the transmission output shaft 82 to a rotor 84 of a motor/generator unit 86. The motor/generator unit 86 includes a stator that is fixed to the transfer case housing, as shown at 88. The motor/generator rotor is connected through sleeve shaft 110 to sun gear 90 of planetary gearing 92. Ring gear 94 of gear unit 92 is fixed to the transfer case housing. Planetary pinions 96 rotatably supported on carrier 98 engage ring gear 94 and sun gear 90.

Drive sprocket 100, which is journalled on the axis of the transmission output shaft, is part of a chain transfer drive or cross-drive that includes driven sprocket 102 and cooperating drive chain 104. Sprocket 102 is journalled in the transfer case housing and is connected driveably to power output shaft 106 for the secondary, front traction wheel and axle wheel assembly.

A 4×4 coupler clutch C connects driveably the output shaft 80 with the carrier 98 of the planetary gearing 92. Since the ring gear 94 of the planetary gearing 92 is fixed to the transfer case housing, sun gear 90 is over-driven with respect to output shaft 80.

Clutches A, B and C may be fluid pressure actuated friction clutches, mechanical synchronizer clutches or positive-drive dog clutches depending upon a design choice.

In the part-time, four-wheel drive configuration of FIG. 2, engine torque can be distributed mechanically to the primary traction wheel and axle assembly. If the motor/generator 86 is energized at this time, motor torque is distributed to sun gear 90 and is multiplied by the planetary gearing 92 to drive sprocket 100. This effects torque delivery from the motor to the secondary differential and axle assembly. This condition is indicated as a two-wheel high operating mode in the chart of FIG. 5. In that mode, regenerative braking torque from the front traction wheels may take place.

If clutch A remains engaged and clutch C is simultaneously applied, the electric motor power boost can be distributed to all four traction wheels for the embodiment of FIG. 2, as indicated in FIG. 5. This is referred to in FIG. 5 as a four-wheel drive high operating mode. Regenerative braking in that mode is available from all four traction wheels.

If clutch A is released and clutch B is applied while maintaining clutch C applied, engine torque can be distributed through clutch B and through sleeve shaft 110 to sun gear 90. Gearing 92 then multiplies sun gear torque as power is distributed to the rear traction wheel and axle assembly. Motor/generator electric power complements engine power as the torque on the rotor 84 drives sun gear 90. A power boost for all four traction wheels is available in the four-wheel high drive mode as well in the four-wheel low drive mode.

As indicated in the chart of FIG. 5 for the embodiment of FIG. 2, regenerative braking torque can be developed from all traction wheels for both the four-wheel high operating mode and the four-wheel low operating mode.

In addition to the drive modes described in the preceding paragraphs, clutches A and B can both be released in some special circumstances, which removes the engine from the power delivery paths and establishes a front-wheel, fully-electric drive with clutch C disengaged. The engine may be turned off at this time. If clutch C is engaged, the powertrain becomes an all-wheel, fully-electric drive.

In addition to the drive modes described in the preceding paragraphs, clutches A and B can both be released in some special circumstances, which removes the engine from the power delivery paths and establishes a front-wheel, fully-electric drive with clutch C disengaged. The engine may be turned off at this time. If clutch C is engaged, the powertrain becomes a four-wheel, fully-electric drive.

A motor/generator unit 124 has a stator 126 fixed to the transfer case housing and a rotor 128 connected through sleeve shaft 130 to sun gear 132 of planetary gear unit 134.

The planetary gear unit 134, which is a torque multiplier, includes a stationary ring gear 136 secured to the transfer case housing, and planetary pinions 138 rotatably supported by carrier 120. Pinions 138 engage sun gear 132 and ring gear 136. The carrier 140 acts as a torque output member. It is connected to drive sprocket 142. A drive chain 144 transfers power to a driven sprocket 146, which in turn is connected driveably to power output shaft 148 for the secondary traction wheel and axle assembly.

Figure 3:
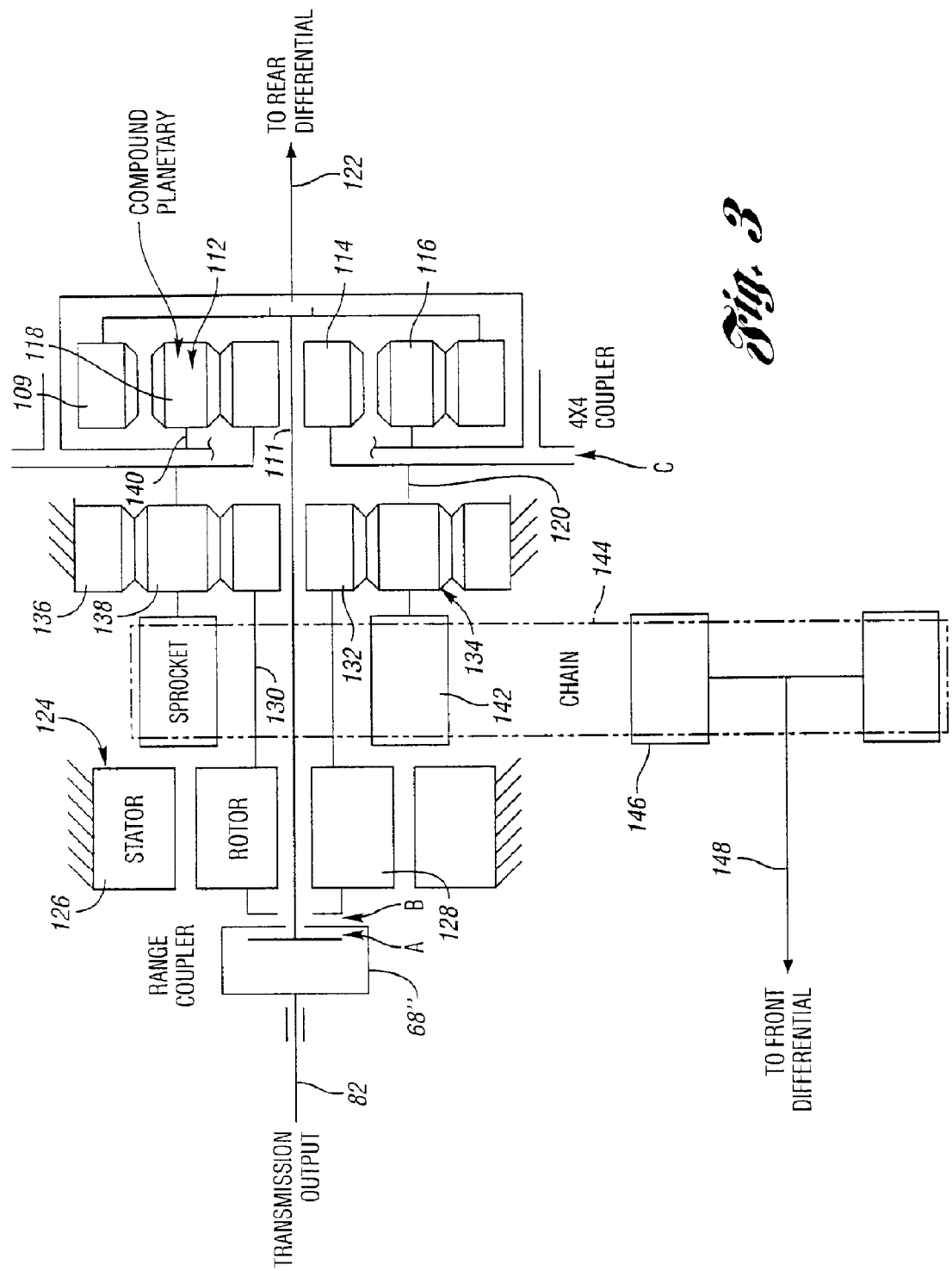
FIG. 3 is a schematic representation of the hybrid electric vehicle powertrain of the invention with an all-wheel drive characteristic and with a 50/50 torque split between the front traction wheels and the rear traction wheels.

As in the case of the embodiment of FIG. 2, the embodiment of FIG. 3 includes a 4×4 coupler C, which, when engaged, connects the sun gear 114 to the compound carrier 140. With clutch C disengaged and clutches A and B disengaged, the engine is removed from the power delivery paths. The engine may be turned off at this time and the powertrain functions as front-wheel, fully-electric drive. If clutch C is engaged, the powertrain becomes a four-wheel, fully-electric drive.

The carrier 120 of the planetary gear unit 134 is connected to the sun gear 114 of the compound planetary gear unit 112. The planetary gear unit 112 acts as a torque splitting differential, which divides torque equally with a 50/50 torque split between the shafts 122 and 148 when 4×4 coupler clutch C is disengaged.

The operating modes for the embodiment of FIG. 3 are indicated in the chart of FIG. 6. An all-wheel drive high operating mode is achieved by engaging clutch A, which drives ring gear 109 of the compound planetary gearing 112 through center shaft 111. Sun gear torque for sun gear 114 is distributed to the carrier for gear unit 134, which drives sprocket 142. In the case of the high all-wheel drive mode illustrated in FIG. 6, a power boost then is distributed to the front wheels as the sun gear 132 drives sprocket 142. Regenerative braking in this mode can be generated by the front wheels.

To achieve a high, locked four-wheel drive operating mode for the embodiment of FIG. 3, clutch A remains applied and clutch C also is applied, which locks carrier 140 to sun gear 114 of the planetary gear unit 112. Under these conditions, motor power can be distributed to all of the traction wheels. Also, regenerative braking from all of the traction wheels is possible.

A low ratio, locked four-wheel drive operating mode is achieved by disengaging clutch A and engaging clutch B while clutch C remains applied. Electric motor power then can be distributed to all four traction wheels and regenerative braking also can be achieved from all four traction wheels.

Figure 4:
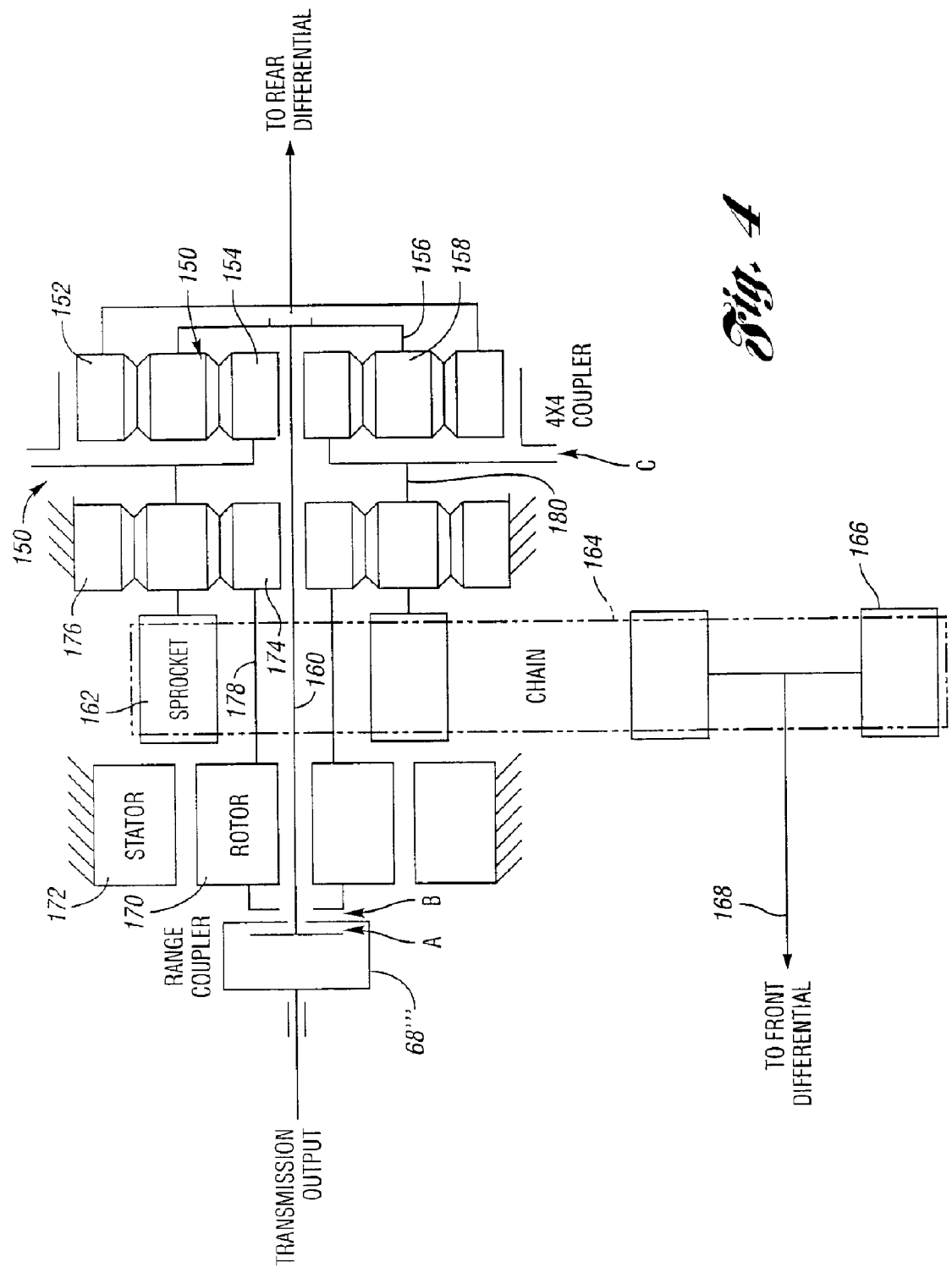
FIG. 4 is a schematic representation of another embodiment of the invention having an all-wheel drive characteristic with a 60/40 torque split between the rear traction wheels and the front traction wheels, respectively.

In the embodiment of FIG. 4, which also has all-wheel drive characteristics, torque is distributed to each of the four traction wheels, but the torque split is made with the ratio that may be about 60:40 rather than a ratio that may be about 50:50. This difference in the torque split is obtained by using a simple planetary torque splitter 150 rather than the compound planetary torque splitter 112 of FIG. 3. The 4×4 coupler clutch C of the embodiment of FIG. 4 selectively connects sun gear 154 to ring gear to lock-up the gear unit 150.

In the embodiment of FIG. 4, the simple planetary torque splitter comprises a ring gear 152, a sun gear 154 and a planetary carrier 156. Planetary pinions 158 are rotatably supported on the carrier 156. Torque is distributed to the carrier 156 through shaft 160 when clutch A is applied.

As in the case of the embodiment of FIG. 3, the embodiment of FIG. 4 includes a torque multiplier planetary gear unit located between the torque splitter gearing and a drive sprocket for the front differential and axle assembly. The drive sprocket of FIG. 4 is shown at 162, which is connected through a chain 164 to a driven sprocket 166. The front traction wheel and axle assembly is connected to the driven sprocket 166 through a torque output shaft 168. Furthermore, rotor 170 of a motor 172 is connected to sun gear 174 of the torque multiplier gear unit. Pinions 158 carried by carrier 180 engage ring gear 176 of the torque multiplier gear unit.

Rotor 170 is connected driveably to sun gear 174 through sleeve shaft 178. Carrier 180 of the torque multiplier gear unit is connected to drive sprocket 162 and to sun gear 154 of the gear unit 150. Pinions of the torque multiplier gear unit engage ring gear 176 and sun gear 174.

The mode chart of FIG. 6 is applicable to the configuration shown in FIG. 4 as well as to the configuration shown in FIG. 3. As in the case of the embodiment of FIG. 3, a motor power boost for the embodiment of FIG. 4 can be distributed to the front wheels in the high all-wheel drive operating mode and to all of the wheels during operation in both the four-wheel locked high operating mode and the four-wheel low locked operating mode. Regenerative braking torque is distributed from the front wheels in the case of the high all-wheel drive operating mode and from all four wheels in the case of the four-wheel drive high locked operating mode and the four-wheel drive low locked operating mode.

Although embodiments of the invention have been disclosed, it will be apparent to a person skilled in the art that modifications may be made without departing from the scope of the invention. All such modifications and equivalents thereof are intended to be covered by the following claims.

What is claimed is:

1. A hybrid electric vehicle powertrain for an automotive vehicle comprising an engine, a first traction wheel and axle assembly, a second traction wheel and axle assembly, a power transmission mechanism driveably connected to the engine and a torque transfer case with a transfer case torque input shaft connected to a transmission mechanism torque output shaft, the powertrain comprising:
    an electric motor;
    a first transfer case torque output shaft connected driveably to the first traction wheel and axle assembly;
    a second transfer case torque output shaft connected driveably to the second traction wheel and axle assembly;
    the electric motor and the first transfer case torque output shaft being assembled on a common first axis;
    a torque multiplier gearset;
    a torque input element of the torque multiplier gearset being connected driveably to the motor;
    the second transfer case torque output shaft being disposed on a second axis that is offset from the first axis;
    a torque cross-drive mechanism driveably connecting a torque output element of the torque multiplier gearset to the second transfer case torque output shaft, and a 4×4 coupler clutch establishing a driving connection between the first transfer case torque output shaft and a torque input element of the torque cross-drive mechanism, the electric motor being connected to the second transfer case torque output shaft only when the 4×4 coupler clutch is open.

2. The hybrid electric vehicle powertrain set forth in claim 1 wherein the torque cross-drive mechanism includes a cross-drive torque input element located on the first axis intermediate the electric motor and the torque multiplier gearset.

3. The hybrid electric vehicle powertrain set forth in claim 2 wherein the 4×4 coupler clutch selectively connects a torque output element of the torque multiplier gearset to the first transfer case torque output shaft.

4. The hybrid electric vehicle powertrain set forth in claim 1 wherein the torque multiplier gearset is a planetary gearset with a ring gear, a sun gear and a pinion carrier, the sun gear being driveably connected to the electric motor and the pinion carrier being the torque output element of the torque multiplier gearset.

5. The hybrid electric vehicle powertrain set forth in claim 4 including a torque splitter differential gearset comprising a compound planetary gearset having a sun gear connected driveably to the pinion carrier of the torque multiplier gearset and a pinion carrier connected to the first transfer case torque output shaft.

6. The hybrid electric vehicle powertrain set forth in claim 5 wherein the 4×4 coupler clutch selectively locks together the sun gear and the pinion carrier of the torque splitter differential gearset to effect a high locked-up ratio and a low locked-up ratio as driving torque is delivered simultaneously to both the first and second traction wheel and axle assemblies.

7. The hybrid electric vehicle powertrain set forth in claim 4 wherein the transfer case includes a torque-splitter differential gearset comprising a simple planetary gearset having a sun gear driveably connected to the pinion carrier of the torque multiplier gearset and a ring gear connected to the first transfer case torque output shaft.

8. The hybrid electric vehicle powertrain set forth in claim 7 wherein the transfer case includes a 4×4 coupler clutch means for selectively locking together the sun gear and the ring gear of the torque-splitter differential gearset to effect a high locked-up ratio and a low locked-up ratio as driving torque is delivered simultaneously to both the first and second traction wheel and axle assemblies.

9. The hybrid electric vehicle powertrain set forth in claim 4 wherein the 4×4 coupler clutch selectively connects the pinion carrier to the first transfer case torque output shaft.

10. The hybrid electric vehicle powertrain set forth in claim 1 wherein the transfer case includes a range coupler clutch for selectively connecting driveably the transmission mechanism torque output shaft to the first transfer case torque output shaft and to the torque input element of the torque multiplier gearset.

11. A hybrid electric vehicle powertrain for an automotive vehicle comprising an engine, a front traction wheel and axle assembly, a rear traction wheel and axle assembly, a power transmission driveably connected to the engine and a torque transfer case with a transfer case torque input shaft connected to a transmission mechanism torque output shaft, the torque transfer case comprising:
    an electric motor;
    a first transfer case torque output shaft connected driveably to the rear traction wheel and axle assembly;
    a second transfer case torque output shaft being connected driveably to the front traction wheel and axle assembly;
    the electric motor and the first transfer case torque input member being assembled on a common first axis;
    a torque multiplier gearset drivably connected to the motor;
    a torque splitter differential gearset having a first torque output element connected to a torque output element of the torque multiplier gearset;
    a range coupler clutch means for selectively connecting the transfer case torque input shaft to a torque splitter differential gearset torque input element and to a torque input element of the torque multiplier gearset;
    a second torque output element of the torque splitter differential gearset being driveably connected to the first transfer case torque output shaft; and
    a 4×4 coupler clutch selectively locking together two torque transmitting elements of the torque splitter differential gearset during simultaneous power delivery to the front and rear traction wheel and axle assemblies.

12. A hybrid electric vehicle powertrain for an automotive vehicle comprising an engine, a front traction wheel and axle assembly, a rear traction wheel and axle assembly, a power transmission mechanism driveably connected to the engine, and a torque transfer case with a transfer case torque input shaft connected to a transmission mechanism torque output shaft, the powertrain comprising:

an electric motor;

first and second transfer case torque output shafts connected driveably, respectively, to the rear and the front traction wheel and axle assemblies;

a torque multiplier gearset;

a torque splitter differential gearset, the torque multiplier gearset, the motor and the torque splitter differential gearset being mechanically coupled to define torque flow paths for electric and mechanical power delivery to the traction wheel and axle assemblies; and a range coupler selectively connecting the transmission torque output shaft through the torque-splitter differential gearset to the first torque transfer case torque output shaft for power delivery to the first traction wheel and axle assembly and to the torque input element of the torque multiplier gearset for power delivery to the second traction wheel and axle assembly.

13. The hybrid electric vehicle powertrain set forth in claim 12 wherein the motor is connected driveably to the torque input element of the torque multiplier gear set.

14. The hybrid electric vehicle powertrain set forth in claim 12 wherein the electric motor, the torque multiplier gearset and the torque splitter differential gearset are disposed on a common axis; and a cross-drive defining a power flow path to the second transfer case torque output shaft, the cross-drive comprising a driving member disposed on the common axis and a driven member disposed on an axis offset from the common axis, the second transfer case torque output shaft being connected to the cross-drive driven member.

15. A hybrid electric vehicle powertrain for an automotive vehicle comprising an engine and a torque transfer case with a transfer case torque input shaft connected drivably to the engine, the powertrain comprising:

an electric motor;

a first transfer case torque output shaft;

a second transfer case torque output shaft;

the electric motor and the first transfer case torque output shaft being assembled on a common axis;

a torque multiplier gearset;

a torque input element of the torque multiplier gearset being connected driveably to the motor;

a range coupler selectively connecting a transmission mechanism torque output shaft to the first transfer case torque output shaft and to the torque input element of the torque multiplier gearset; and a torque cross-drive mechanism driveably connecting a torque output element of the torque multiplier gearset to the second transfer case torque output shaft.

16. The hybrid electric vehicle powertrain set forth in claim 15 wherein the second transfer case torque output shaft is disposed on an axis that is offset from and parallel to the common axis.

17. The hybrid electric vehicle powertrain set forth in claim 15 wherein the torque output shaft axis is offset in a lateral direction from the common axis.

* * * * *